United States Patent [19]

Benson

[11] 4,440,323

[45] Apr. 3, 1984

[54] DEVICE FOR DISPENSING METERED QUANTITIES OF FLUID FROM A CONTAINER

[75] Inventor: Gustav E. V. Benson, Malmö, Sweden

[73] Assignee: Patra AG, Lucerne, Switzerland

[21] Appl. No.: 319,729

[22] Filed: Nov. 9, 1981

[30] Foreign Application Priority Data

Nov. 12, 1980 [SE] Sweden ................................ 8007934

[51] Int. Cl.³ .............................................. G01F 11/32
[52] U.S. Cl. .................................... 222/209; 222/425; 222/449; 222/447; 222/205
[58] Field of Search ............... 222/445, 447, 449, 450, 222/451, 424.5, 425, 209, 207, 212, 213, 205; 251/12; 137/614.14, 614.18

[56] References Cited

U.S. PATENT DOCUMENTS

| | | | |
|---|---|---|---|
| 2,325,210 | 7/1943 | Swihart | 222/207 |
| 2,780,177 | 2/1957 | Hoenecke | 417/566 X |
| 3,160,329 | 12/1964 | Radic et al. | 222/207 X |
| 3,494,512 | 2/1970 | Haynes | 222/383 |

Primary Examiner—Joseph J. Rolla
Assistant Examiner—Thomas C. Fitzgerald
Attorney, Agent, or Firm—Robert E. Burns; Emmanuel J. Lobato; Bruce L. Adams

[57] ABSTRACT

A device for dispensing metered quantities of fluid from a container. The device comprises a through-flow passageway in which is arranged a valve chamber. A lower valve seat and an upper valve seat delimit said valve chamber. The valve seats are parts of two valve portions and may be closed by a lower and an upper valve body. A pressurizing bulb is arranged to generate a vacuum or excess pressure in the valve chamber. The device operates in the following manner. When the pressurizing bulb is compressed, soap solution is forced through the lower valve seat while the upper valve seat remains closed. When the pressure on the bulb is released, the bulb resumes its original shape and the vacuum thus created draws in fluid through the upper valve seat while the lower seat remains closed.

8 Claims, 7 Drawing Figures

DEVICE FOR DISPENSING METERED QUANTITIES OF FLUID FROM A CONTAINER

BACKGROUND OF THE INVENTION

The invention concerns a device allowing fluids to be dispensed from a container in metered quantities. It is particularly applicable and useful for dispensing soap solutions.

Prior-art devices designed for this purpose suffer from a number of drawbacks. Devices of the kind indicated must be able to meet strict demands on hygiene and functional safety. Soap solutions of the kind generally used have certain qualities which make them unsuitable for use together with fluid-dispensing devices designed for fluids having other properties than the soap solutions. For instance, the dispensing device disclosed in U.S. Pat. No. 3,220,611 is quite unsuitable for dispensing soap solutions. This prior-art device is equipped with a discharge valve made from an elastic material and has a conically tapering shape. The outlet opening is formed as a slot extending across the jacket face of the cone. The soap solution remaining in the outlet opening or immediately internally thereof between uses will oxidize since it will come into contact with the surrounding air. As a result, a plug will form which obstructs the outlet opening and makes further dispensing impossible.

The purpose of the subject invention is to provide a dispensing device which meets the demands set forth above without suffering from the drawbacks of prior-art dispensers and which in addition is easy and cheap to manufacture, easy to assemble and mount as well as to maintain and which is highly reliable.

SUMMARY OF THE INVENTION

The device in accordance with the invention is designed to allow dispensing of fluids in dosed or metered quantities from a container via a fluid outlet opening and it comprises a through-flow passageway in which is arranged a valve chamber in communication with a pressurizing bulb. The device is characterised in that the valve chamber is delimited by an upper valve seat and a lower valve seat, in that an upper valve body is arranged to be pressed against the upper valve seat into sealing position in response to an excess pressure in the valve chamber but to be pulled away from the upper valve seat to expose the latter in response to a vacuum pressure in said valve chamber, in that a lower valve body is arranged to be pulled against the lower valve seat into sealing position against the latter in response to a vacuum pressure in the valve chamber but to be pressed clear away from said lower valve seat so as to open the latter in response to an excess pressure in said valve chamber, and in that the outlet opening of the through-flow passageway is spaced from the lower valve seat.

Further characteristics of the dispenser in accordance with the subject invention will appear from the appended claims.

BRIEF DESCRIPTION OF THE DRAWINGS

The invention will be described in closer detail in the following with reference to the accompanying drawings, wherein.

DETAILED DESCRIPTION OF PREFERRED EMBODIMENTS

Figure 1:
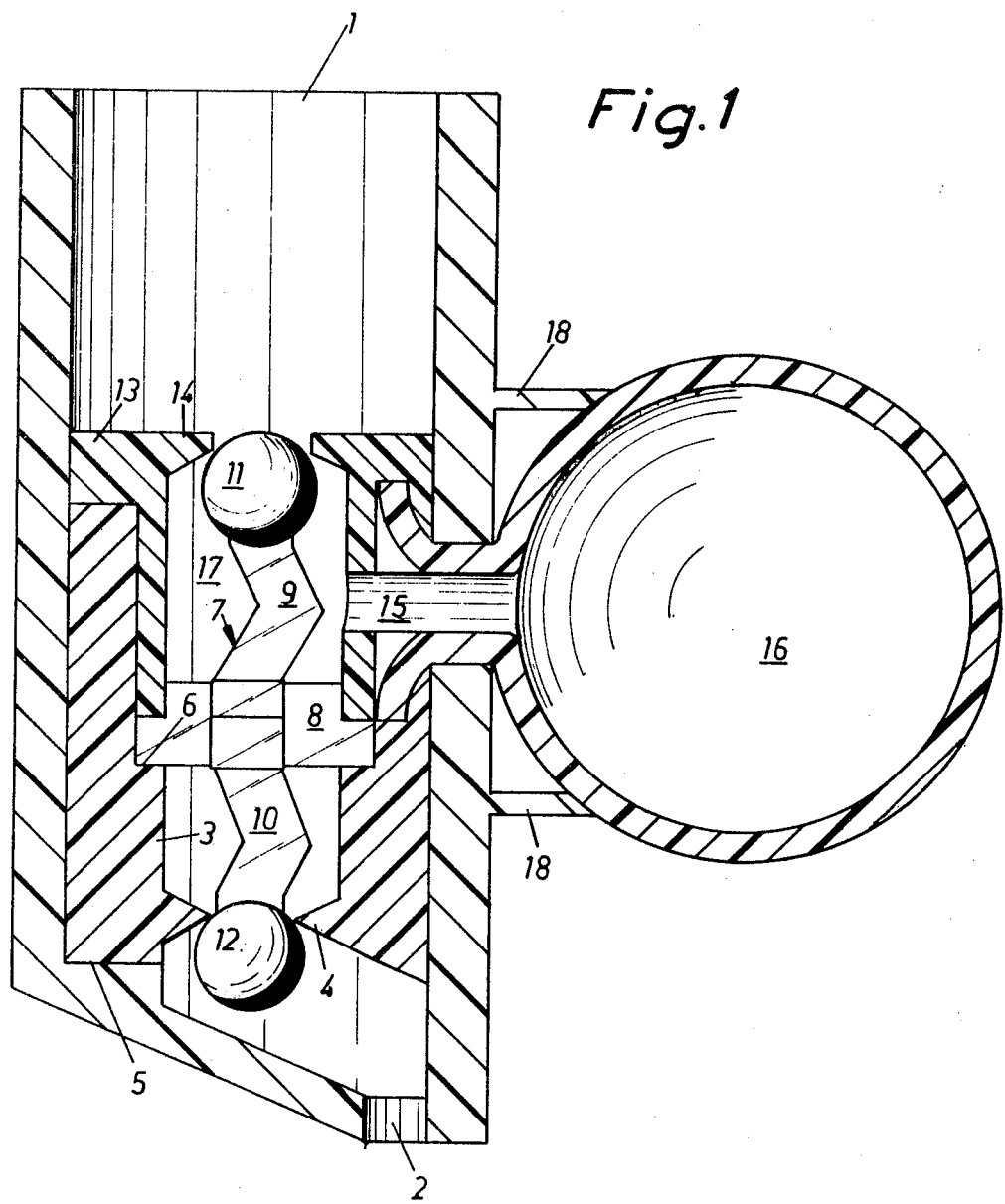
FIG. 1 is a cross-sectional view through a first embodiment of a dispensing device in accordance with the invention, shown in the suction position.

A through-flow passageway 1 extends from a container (not shown) to an outlet opening 2. In the through-flow passageway is mounted a lower valve portion 3 in which is formed a valve seat 4. The latter is spaced a certain distance away from the outlet opening 2. The position of the valve portion 3 is determined by an interior shoulder 5 formed in the through-flow passageway. A groove 6 is formed on the inner face of the valve portion 3.

In the groove 6 is mounted a valve member 7 consisting of a plate element 8 on which are secured respectively an upper resilient arm 9 and a lower resilient arm 10. Each one of these arms supports at its extremities a valve body 11 and 12, respectively, in the form of a ball.

An upper valve portion 13 is inserted into the passageway 1 and mounted on the lower valve portion. An upper valve seat 14 is formed in the upper valve portion 13 as is also a channel 15, by means of which a pressurizing bulb 16 communicates with a space which is formed between the two valve seats 4 and 14 and which space forms a valve chamber 17. Stays 18 support the pressurizing bulb.

The arms 9 and 10 are biased to urge the valve balls 11 and 12 into engagement with their associated valve seats 4 and 14, the upper ball being pressed upwards while the lower one is pulled upwards. In the inoperative position of the device the balls therefore abut sealingly against their respective valve seat.

Figure 2:
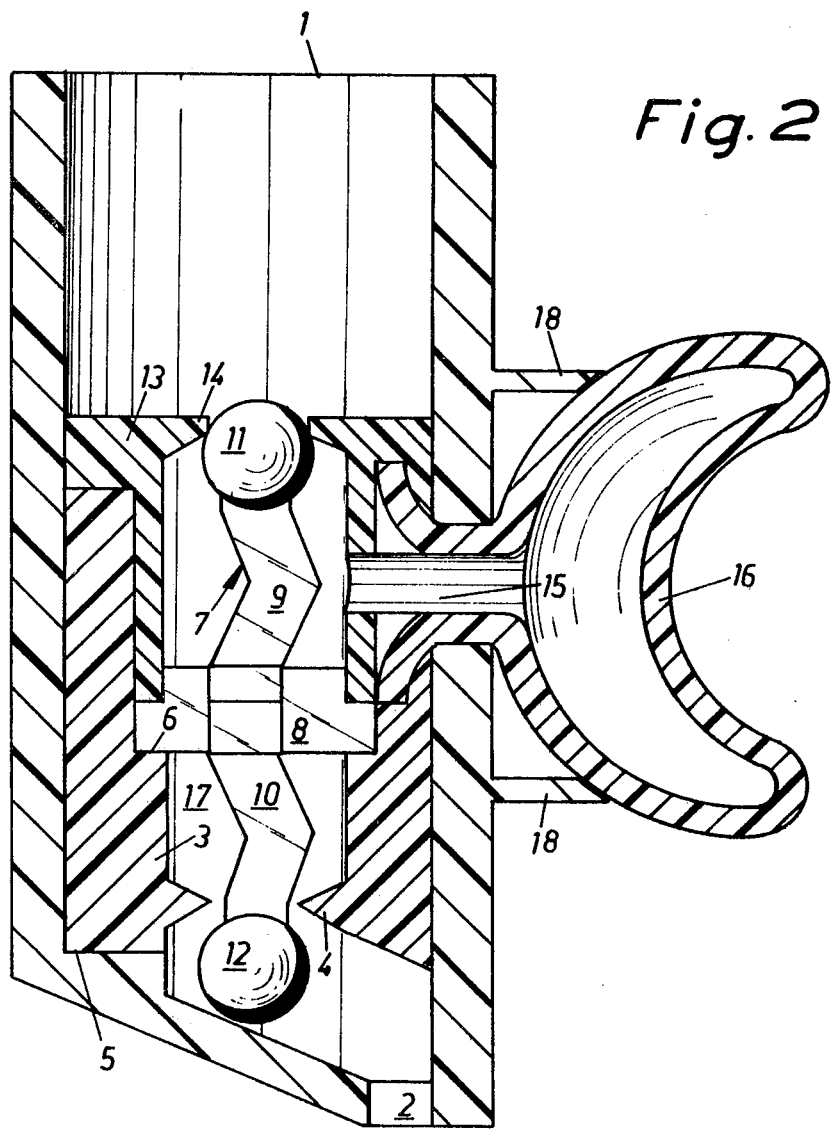
FIG. 2 is a cross-sectional view through the same device but showing the dispensing or discharge position.

The device functions in the following manner. When the pressurizing bulb 16 is compressed, i.e. is pressed inwards, an excess pressure is generated in the valve chamber 17. As a result, the lower valve body 12 is urged downwards, that is away from the valve seat 4 which thus is opened. At the same time, the upper valve body 11 is pressed against the upper valve seat 14, the latter thus remaining closed. This position is illustrated in FIG. 2. Soap solution contained in the valve chamber 17 is forced through the valve seat 4 and further out through the outlet or discharge opening 2. When the pressure on the bulb 16 ceases, the latter immediately resumes its original configuration due to its inherent resiliency. The vacuum generated in the valve chamber draws the upper valve body 11 downwards and the lower valve body 12 upwards, the latter being pressed hard against the lower valve seat 4, sealing it efficiently. This position is shown in FIG. 1. Soap solution is sucked through the upper valve seat 14 into the valve chamber 17. When, on account of the vacuum pressure in the valve chamber 17, the force acting on the valve body becomes less than the bias force by means of which the arm 9 urges the valve body 11 upwards, the valve body 11 again closes the valve seat 14. Once again, the device assumes the original position and is ready to perform another working cycle.

The device is easily mounted in the through-flow passageway 1. Initially, the valve member 7 is positioned on the valve portion 3. Also, the valve body 12 is pressed through the valve seat 4 and the valve plate 8 is introduced into the groove 6. When the valve portion 3 and the valve member 7 are interconnected, the upper valve portion 13 is place in position, that is on top of the lower valve portion 3. The upper valve portion 13 is turned, whereby the channel 15 is formed. The entire device thus formed is then placed in position in the through-flow passageway 1. The shoulder 5 determines the position of the device vertically. When the device is in position, the pressurizing bulb 16 is mounted in position in that its mouth is compressed, allowing the latter to be introduced into the channel 15.

Figure 3:
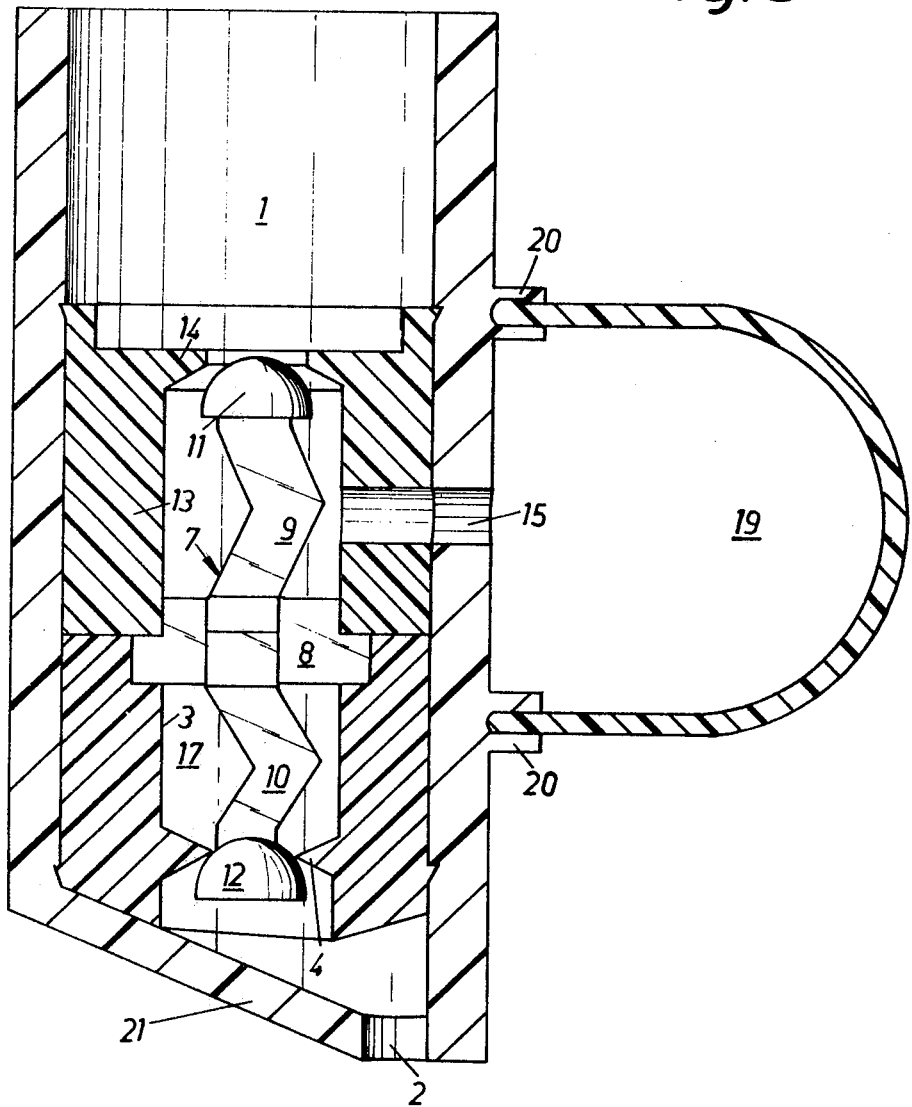
FIG. 3 is a cross-sectional view through a second embodiment of the invention, the device being shown in the suction position.
Figure 4:
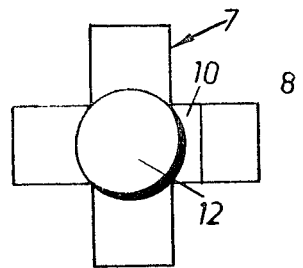
FIG. 4 is a view from below of a valve member in accordance with the invention.
Figure 5:
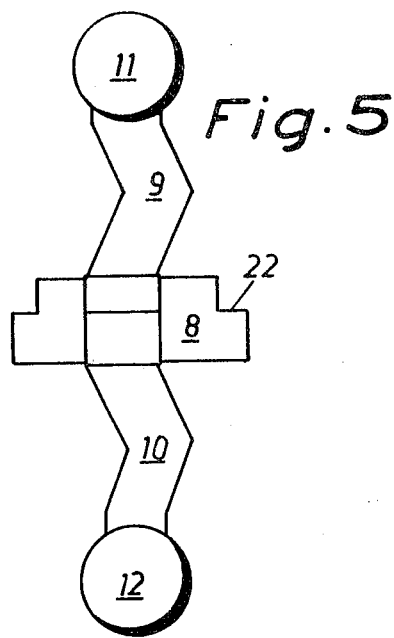
FIG. 5 is a lateral view of the valve of FIG. 4.

The embodiment shown in FIG. 3 is slightly different from the one in FIG. 2 in that the pressurizing bulb 19 has a semi-spherical shape. The bulb is secured to supports 20 through hot-upsetting, welding or glueing. The principle of function of the device according to this embodiment is, however, identical with the one described in connection with the preceding embodiment.

Also the valve bodies 11 and 12 may be given a semi-spherical shape instead of a spherical one, as illustrated in FIGS. 1 and 2. Also, the valve portions 3 and 13 may be differently shaped. The inner shoulder 5 is eliminated in accordance with this embodiment. Instead, the lower part of the lower valve portion 3 has a shape matching the sloping part 21 of the wall of the through-flow passageway. The two valve portions 3 and 13 are fitted together in a manner which slightly deviates from that shown in FIGS. 1 and 2. The upper valve portion 13 is fitted onto the lower portion instead of being inserted into the latter.

It should be obvious that the pressurizing bulb 19 may be combined with valve portions 3, 13 and the valve member 7 designed as illustrated in FIG. 2.

Figure 7:
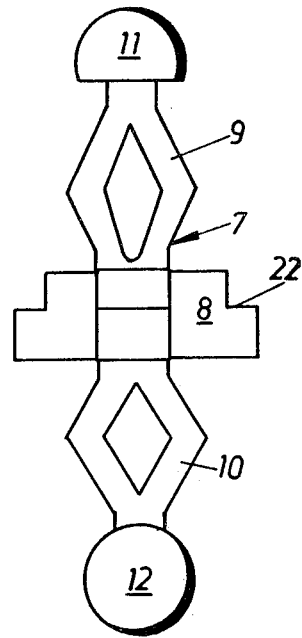
FIG. 7 is a lateral view showing an alternative embodiment of the valve member in accordance with the invention.
Figure 6:
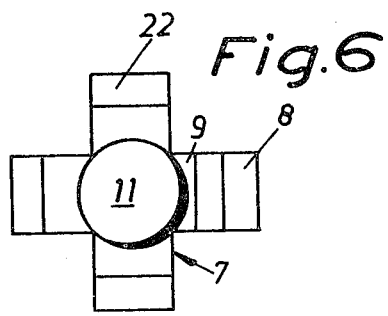
FIG. 6 is a view from above of the valve of FIG. 4.

The plate member 8 of the valve member 7 is in the shape of a cross, allowing soap solution to flow past it. The plate member 8 is provided with a groove 22 to accomodate the upper valve portion 13. The lower valve arm 10 is slightly stronger than the upper one to give the desired, stronger bias. The valve arms may have the shape shown in FIG. 7, that is bifurcated.

The pressurizing bulbs 16, 19 are preferably made from injection-moulded resilient plastics or some equivalent material and the valve portions 3, 13 preferably are made from injection-moulded rigid plastics. The valve member 7 could be made from vulcanized rubber or an equivalent material. This is true also with regard to the pressurizing bulb.

The embodiments described above are to be regarded as examples only of a device produced in accordance with the concepts of the invention and a number of various modifications are possible within the scope of the appended claims. The valve bodies 11 and 12 may be spherical or semi-spherical and the valve arms 9 and 10 be either divided, that is bifurcated, or have a simple one-branch shape and all embodiments may be combined as desired.

What I claim is:

1. In a device for dispensing metered quantities of fluids from a container said device comprising a through-flow passageway having a fluid outlet opening, a valve chamber in said passageway, and a pressurizing bulb in communication with said valve chamber, an upper valve seat and a lower valve seat, said upper and lower valve seats delimiting said valve chamber, an upper valve body arranged to be pressed against said upper valve seat into sealing position in response to an excess pressure in said valve chamber but to be pulled away from said upper valve seat to expose the latter in response to a vacuum pressure in said valve chamber, a lower valve body arranged to be pulled against said lower valve seat into sealing position against the latter in response to a vacuum pressure in said valve chamber but to be pressed clear away from said lower valve seat so as to open the latter in response to an excess pressure in said valve chamber, the improvement comprising a plate positioned in said valve chamber between said valve bodies, said plate being arranged to allow passage of fluid, and resilient arm members interconnecting said valve bodies and said plate.

2. An improved device as claimed in claim 1, wherein said fluid outlet opening of said through-flow passageway is spaced from said lower valve seat.

3. An improved device as claimed in claim 1, wherein said pressurizing bulb is spherical, stays being provided to support said pressurizing bulb, a channel communicating said pressurizing bulb with said valve chamber.

4. An improved device as claimed in claim 1, wherein said lower valve body is arranged to be pressed against said lower valve seat with a bias force in excess of the bias force with which said upper valve body is pressed against said upper valve seat.

5. An improved device as claimed in claim 1, wherein each one of said resilient arm members is in the form of a single branch.

6. An improved device as claimed in claim 1, wherein each one of said resilient arm members consists of several branches.

7. An improved device as claimed in claim 1, for use in the outlet channel of a fluid container, the improvement comprising a lower tubular valve portion arranged to fit into a lower end of said outlet channel, said lower valve seat being formed in said lower valve portion, a groove formed in said lower valve portion, said plate being shaped to fit into said groove, an upper valve portion shaped to fit into said fluid container outlet channel and onto said lower valve portion, said upper valve portion being arranged, in mounted position, to determine the position of said plate, said upper valve seat being formed in said upper valve portion, said channel communicating said valve chamber with said pressurizing bulb.

8. An improved device as claimed in claim 7, wherein said lower valve body is made from a material which is sufficiently elastic to allow said body to be pressed through said lower valve seat when said device is assembled.

* * * * *

UNITED STATES PATENT AND TRADEMARK OFFICE
CERTIFICATE OF CORRECTION

PATENT NO. : 4,440,323

DATED : April 3, 1984

INVENTOR(S) : Gustav Erik Valdemar Benson

It is certified that error appears in the above-identified patent and that said Letters Patent is hereby corrected as shown below:

On the title page Item /73/ should read

-- /73/ Patara AG, Lucerne, Switzerland --.

Signed and Sealed this

Eighteenth Day of December 1984

[SEAL]

Attest:

*Attesting Officer*

GERALD J. MOSSINGHOFF

*Commissioner of Patents and Trademarks*